(12) United States Patent
Fouquet et al.

(10) Patent No.: US 6,956,985 B2
(45) Date of Patent: Oct. 18, 2005

(54) SEMICONDUCTOR-BASED OPTICAL SWITCH ARCHITECTURE

(75) Inventors: Julie E. Fouquet, Portola Valley, CA (US); Brian E. Lemoff, Union City, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 194 days.

(21) Appl. No.: 10/337,638

(22) Filed: Jan. 7, 2003

(65) Prior Publication Data
US 2004/0131305 A1 Jul. 8, 2004

(51) Int. Cl.[7] .................................................. G02B 6/26
(52) U.S. Cl. ........................................ 385/16; 385/17
(58) Field of Search ..................................... 385/16–18

(56) References Cited

U.S. PATENT DOCUMENTS

| | | | |
|---|---|---|---|
| 4,521,069 A * | 6/1985 | Ikeda ............................ | 385/16 |
| 5,629,992 A * | 5/1997 | Amersfoort et al. ........... | 385/15 |
| 5,892,863 A * | 4/1999 | Presby ........................ | 385/16 |
| 5,953,143 A * | 9/1999 | Sharony et al. ................ | 398/46 |
| 6,337,762 B1 * | 1/2002 | Ueno ........................... | 359/332 |
| 6,542,655 B1 * | 4/2003 | Dragone ....................... | 385/17 |
| 6,856,768 B2 * | 2/2005 | Gnauck et al. ............... | 398/83 |
| 2001/0010739 A1 * | 8/2001 | Takiguchi et al. ............ | 385/15 |
| 2002/0037126 A1 * | 3/2002 | Martinelli et al. ............ | 385/11 |
| 2002/0076133 A1 * | 6/2002 | Li et al. ........................ | 385/16 |
| 2002/0131675 A1 * | 9/2002 | Litvin .......................... | 385/16 |
| 2003/0123785 A1 * | 7/2003 | Sugitani et al. ............... | 385/16 |

FOREIGN PATENT DOCUMENTS

GB 2211956 A * 7/1989 ............. G02F 1/21

* cited by examiner

Primary Examiner—Ellen E. Kim

(57) ABSTRACT

A semiconductor-based optical switch engine switches input light from an input switch element to an output switch element and directly couples through an optical waveguide each output of the input switch element to a respective input of the output switch element. The switch architecture reduces signal cross-talk because each signal passes through the optical switch engine using a dedicated optical path. The optical switch engine also maintains a consistent signal-to-noise ratio among all the paths through the switch and reduces the total number of switch points through which an optical signal may pass.

13 Claims, 7 Drawing Sheets

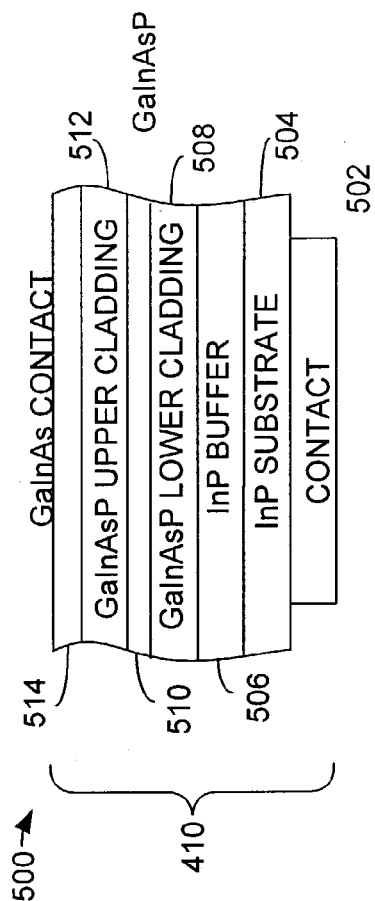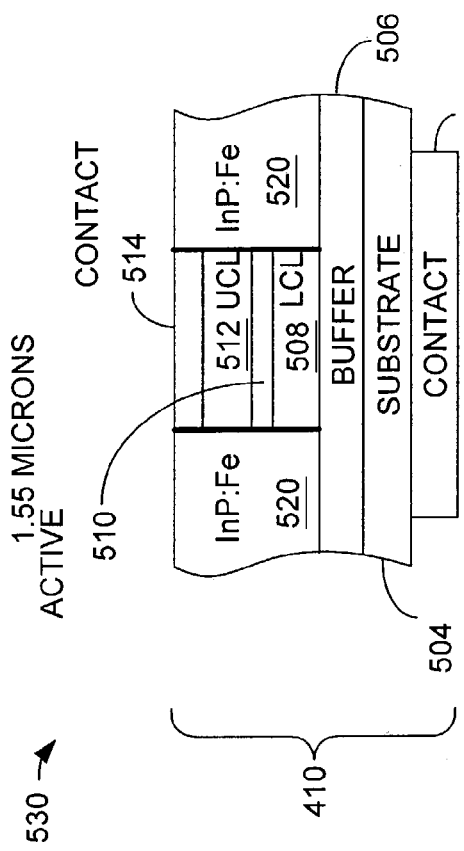

SEMICONDUCTOR-BASED OPTICAL SWITCH ARCHITECTURE

TECHNICAL FIELD

The present invention relates generally to optical fiber communication, and, more particularly, to a semiconductor based optical switch architecture.

BACKGROUND OF THE INVENTION

Optical communication systems have been in existence for some time and continue to increase in use due to the large amount of bandwidth available for transporting signals. In a typical optical communication system, switching systems located along the fiber spans connect the spans of optical fibers. These switching systems are used both to route the optical signals to their destination, and to add and remove optical signals from the optical fibers.

Generally, the two primary communication-switching technologies in use today are circuit switching technology and packet switching technology. Currently, optical switching systems are primarily used in circuit switching applications in which an end to end communication path is established for a relatively long period of time. In circuit switching applications, switching speeds, or changes in state of the optical switching element, on the order of 10 milliseconds (ms) are typical.

Packet switching technology, on the other hand, divides information into packets where each packet is switched individually, and may traverse the communication network using a different path. Typically, packet switches have been implemented in the electrical domain to switch electrical signals because, due to the nature of the packetized data, packet buffering is often required to prevent two packets from being transmitted simultaneously to the same output of the switch. Due to the difficulty in buffering an optical signal, optical packet switches have not been commercially developed. However, it may be desirable to include an optical packet switching engine as part of a larger electrical packet switch. Furthermore, because each communication packet typically has a duration of less than 1 ms, conventional optical switching systems that are employed in circuit switching technologies are incapable of changing state quickly enough to be used in packet switching applications.

Previous attempts at fabricating an optical switch engine that can change state sufficiently fast to be useful as a packet switch have resulted in optical switches that are large, inefficient and that allow an unacceptably large amount of cross-talk between the switched signals. One such optical switch uses a substrate of lithium niobate ($LiNbO_3$) upon which are fabricated a pair of coupled optical waveguides and a means of altering the refractive index of one or both waveguides.

Another attempt at an optical switching arrangement suitable for use as a packet switch uses a matrix of intersecting input and output waveguides. Each intersection is arranged in a "Y" configuration such that an optical input signal is divided into two signals, where each signal is approximately ½ as intense as the original input signal. An amplifier is located in each arm of the "Y." Forward biasing one of the amplifiers while reverse biasing the other amplifier performs the switching function, allowing light to continue through the intersection or be switched to the intersecting waveguide.

A drawback of such an optical switch is that while the forward biased amplifier amplifies the light, the amplification lowers the signal-to-noise ratio of the optical signal. For a few elements, this drawback is relatively negligible. However, when multiplied over many switch elements, this drawback can become significant.

In the past, this switching technology has been implemented as a "matrix" switch. In a matrix switch, a plurality of input waveguides intersects a plurality of output waveguides, thus forming what are referred to as "crosspoints" at the intersections. One of these switches, including the "Y" splitter and two amplifiers, is located at each crosspoint. In such an arrangement, the maximum number of crosspoints that an optical signal may traverse is 2N-1, where N is the number of inputs and outputs. The maximum signal-to-noise ratio degradation (for optical signals traversing many crosspoints) in large matrix switches limits their use in a packet switching network. Further, depending on the positions of the inputs and outputs, one input signal will traverse a different number of crosspoints than another input signal. Signals taking shorter paths through the switch will have a better signal-to-noise ratio than signals taking a longer path and will experience varying amounts of crosstalk due to the different path lengths through the matrix switch.

Therefore, there is a need in the industry for an optical switch capable of fast changes of state, having low cross-talk and balanced signal-to-noise ratio performance, and capable of being economically manufactured to be useful in a packet switching environment.

SUMMARY OF THE INVENTION

The invention is a semiconductor-based optical switch engine in which input light is switched from an input switch element to an output switch element and where each output of the input switch element is directly coupled through a low loss optical waveguide to a respective input of the output switch element. The switch architecture reduces signal cross-talk because each signal passes through the optical switch engine using a dedicated optical path of substantially equal length. The optical switch engine also maintains a consistent signal-to-noise ratio among all the paths through the switch.

Other apparatus, methods, and features of the invention will be or become apparent to one with skill in the art upon examination of the following drawings and detailed description. It is intended that all such additional systems, methods, and features, be included within this description, be within the scope of the present invention, and be protected by the accompanying claims.

BRIEF DESCRIPTION OF THE DRAWINGS

Embodiments in accordance with the invention, as defined in the claims, can be better understood with reference to the following drawings. The components within the drawings are not necessarily to scale relative to each other, emphasis instead being placed upon clearly illustrating the principles of the present invention.

FIGS. 5A and 5B are cross-sectional schematic views collectively illustrating different views of an exemplary embodiment in accordance with the invention of the amplifier portions of FIG. 4.

DETAILED DESCRIPTION OF THE INVENTION

While described below using indium phosphide (InP) and related compounds, the invention is applicable to other compound semiconductor materials such as, for example but not limited to, gallium arsenide (GaAs) and related compounds, and type II–VI semiconductor materials, etc.

Figure 1:
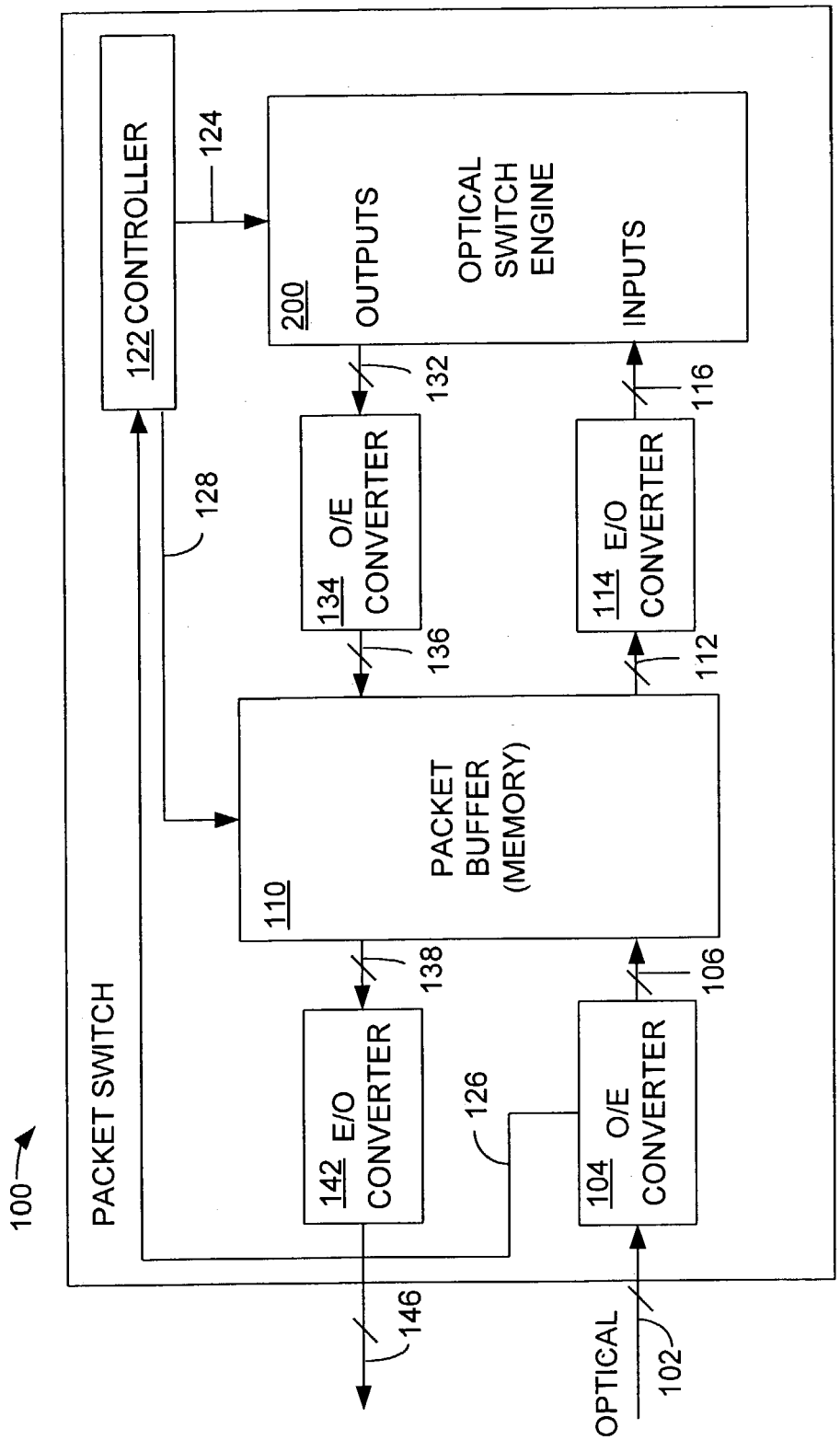
FIG. 1 is a schematic view illustrating a packet switch in which the optical switch engine in accordance with an embodiment of the invention resides.

FIG. 1 is a block diagram illustrating an exemplary packet switch 100 in which an embodiment in accordance with the optical switch engine 200 of the invention resides. Although useful for switching a single optical signal, the packet switch 100 generally receives a plurality of optical signals over connection 102. Connection 102 can be, for example, but not limited to, one or more optical paths each carrying one or more optical signals. An optical signal on connection 102 is directed to an opto/electronic converter 104. The opto/electronic converter 104 converts the optical signal on connection 102 into an electrical signal. After converting the optical signal on connection 102 to an electrical signal, the opto/electronic converter 104 transfers the electrical signal via connection 106 to the packet buffer 110. As known by those having ordinary skill in the art, the packet buffer 110 may comprise one or more memory elements for storing electrical signals.

The opto/electronic converter 104 also communicates via connection 126 with the controller 102. The information conveyed from the opto/electronic converter 104 to the controller 122 includes a definition of each optical signal that was converted to an electrical signal and placed in the packet buffer 110. Essentially, the opto/electronic converter 104 communicates to the controller 122 via connection 126 the destination of each of the converted signals transferred to the packet buffer 110. The controller 122 uses this information to communicate with the optical switch engine 200, which is constructed in accordance with an embodiment of the invention, and with the packet buffer 110 via connection 128. The controller 122, via connections 124 and 128, determines the appropriate routing of signals within the optical switch engine 200, and determines the appropriate duration that an electrical signal will remain in the packet buffer 110 (e.g., to avoid contention). The controller 122 also arbitrates contention between input and output connections within the optical switch engine 200 and ultimately controls the operation of the optical switch engine 200.

The electrical signals are supplied from the packet buffer 110 via connection 112 to electro/optical converter 114. The electro/optical converter 114 converts the signals received from the packet buffer 110 from electrical signals on connection 112 into optical signals on connection 116. The optical signals on connection 116 form the optical inputs to the optical switch engine 200. Similar to the connection 102, the connection 116 may comprise one or more optical paths over which one or more optical signals are routed to the optical switch engine 200.

Under the direction of the controller 122, and based upon the information received from the opto/electronic converter 104, the controller 122, via connection 124, controls the optical switch engine 200 so that input signals on connection 116 are directed to appropriate output connections 132. The connections 116 and 132 are shown as single lines, but, in practice, will each contain one or more optical paths, each optical path carrying one or more optical signals. As will be described in further detail below, the optical switch engine 200, in accordance with an embodiment of the invention, switches optical signals between inputs 116 and outputs 132 in a way such that cross-talk between the signals in the optical switch engine 200 is minimized, and in which the signal-to-noise ratio between and among all the signals traversing the optical switch engine 200 remains relatively constant.

The optical signals on connection 132 are supplied to opto/electronic converter 132, which operates similarly to the opto/electronic converter 104. The opto/electronic converter 134 converts the optical signals on connection 132 to electrical signals, and supplies the electrical signals over connection 136 to the packet buffer 110.

The controller 122 also determines the duration of time that an electrical signal received from the opto/electronic converter 134 will remain in the packet buffer 110. At an appropriate time, the optical signals are forwarded from the packet buffer 110 via connection 138 to the electro/optical converter 142 for conversion to the optical domain. The optical signals from the electro/optical converter 142 are then placed on optical connection 146. In similar manner to that described with reference to connection 102, the optical connection 146 can comprise one or more optical paths, each carrying one or more optical signals.

Alternatively, the packet switch 100 may take other forms. For example, the packet switch 100 may be constructed so that optical signals are converted to the electrical domain and buffered only if there is contention for switching paths in the optical switch engine 200. All such alternative implementations of the packet switch 100 are considered within the scope of the invention.

Figure 2:
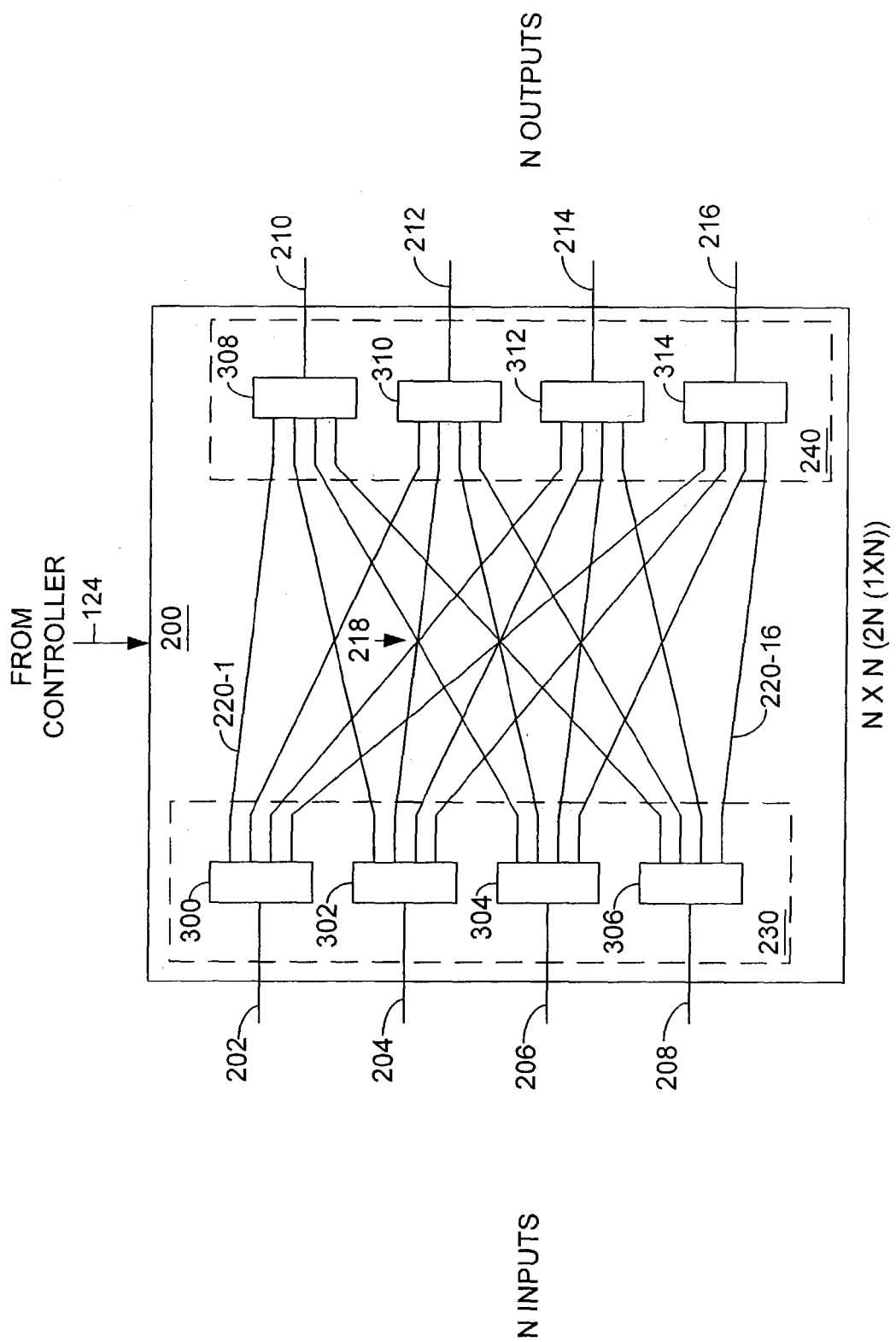
FIG. 2 is a schematic view illustrating the optical switch engine of FIG. 1.

FIG. 2 is a schematic view illustrating the optical switch engine 200 of FIG. 1. For ease of illustration, the optical switch engine 200 is arranged in a 2N (1×N) architecture configuration, where N is the number of inputs and outputs of the switch engine 200. In the example shown in FIG. 2 N=4. However, embodiments in accordance with the invention are applicable to configurations in which there are a different number of inputs and outputs. Such an alternative configuration will be described below with respect to FIG. 6.

The optical switch engine 200 includes a plurality of input 1×N switch elements collectively referred to using reference numeral 230, exemplary ones of which are illustrated using reference numerals 300 through 306. In the embodiment in accordance with the invention shown in FIG. 2, the input 1×N switch elements are each 1×4, having one input and four outputs. For example, the input to 1×N switch element 300 is via connection 202, while the output of 1×N switch element 300 comprises connections 220-1 through 220-4. While shown as having a single input (102) in FIG. 1, the optical switch engine 200 shown in FIG. 2 illustrates an input 202, 204, 206 and 208 for each switch element 300, 302, 304 and 306, respectively.

In accordance with the architecture depicted in FIG. 2, the four outputs of the 1×4 switch element 300 are supplied to the first inputs of four N×1 output switch elements 240. Exemplary output N×1 switch elements are indicated using reference numerals 308, 310, 312 and 314. The output N×1 switch elements 240 are similar in configuration to the 1×N switch elements 230, but are labeled "N×1" for ease of illustration.

The first output of the 1×N switch element 300 connects via connection 220-1 to a first input of N×1 switch element 308. The connection 220-1 is preferably a dedicated, optical waveguide structure that can include, for example, a semiconductor based waveguide structure or an optical fiber. An exemplary semiconductor based waveguide structure will be described in detail below. Furthermore, in the arrangement shown in FIG. 2, the connection 220-1 represents a dedicated path through the switch, thus connecting 1×N switch element 300 with N×1 switch element 308. The connections 220-2 through 220-16 are similar, and are also substantially similar in length. By being substantially similar in length, the connections 220-1 through 220-16 allow for similar delay through the switch for all optical signals. Furthermore, the number of connections 220 will vary with the number and configuration of the 1×N and N×1 switch elements.

The dedicated connection between each output of the input 1×N switch elements 230 and each input of the output N×1 switch elements 240 causes each optical signal passed through the switch to traverse the same number of switch elements. Because each optical signal traverses the same number of crosspoints through the optical switch engine 200, the signal-to-noise ratio among all the optical signals traversing the optical switch engine 200 is equalized. Furthermore, the 2N (1×N) architecture illustrated in FIG. 2 is extremely resistant to cross-talk because of the aforementioned single path that each optical signal traverses through the switch.

The 2N (1×N) architecture also minimizes the total number of crosspoints that each signal will traverse through the optical switch engine 200. A matrix switch architecture, where each input waveguide intersects each output waveguide results in a maximum number of crosspoints of 2N−1. This equates to 255 crosspoints for a 128×128 matrix switch architecture. As will be described in detail below, the 2N (1×N) architecture illustrated in FIG. 2 significantly reduces the maximum number of crosspoints that an optical signal may traverse through the switch.

As shown in FIG. 2, the outputs of each 1×N switch element 300 through 306, are connected to the inputs of each N×1 switch element 308 through 314. In this manner, an optical signal entering any of the input 1×N switch elements 230 via connections 202–208, is individually and independently routed through the optical switch engine 200 to one of the output connections 210–216. It should be mentioned that the signal remains in the optical domain through the optical switch engine 200.

With respect to the optical waveguides 220, while illustrated as more than two waveguides crossing at a single point, no more than two of the waveguides 220-1 through 220-16 should cross each other at any single point. Furthermore, the waveguides should preferably cross each other at steep angles of incidence so that signal cross-talk is avoided. Such a structure is possible to construct using semiconductor manufacturing techniques to be described below, or can be constructed using optical fibers.

Further, the waveguides 220-1 through 220-16 will typically be constructed having bends. As known to those having ordinary skill in the art, bends can be fabricated in the waveguides 220-1 through 220-16 by, for example, patterning bends in the semiconductor material or by using the principles of total internal reflection. Total internal reflection can be achieved by, for example, etching reflective vertical walls at adequately sharp corners of the waveguide structure in accordance with Snell's law as known to those having ordinary skill in the art.

Figure 3:
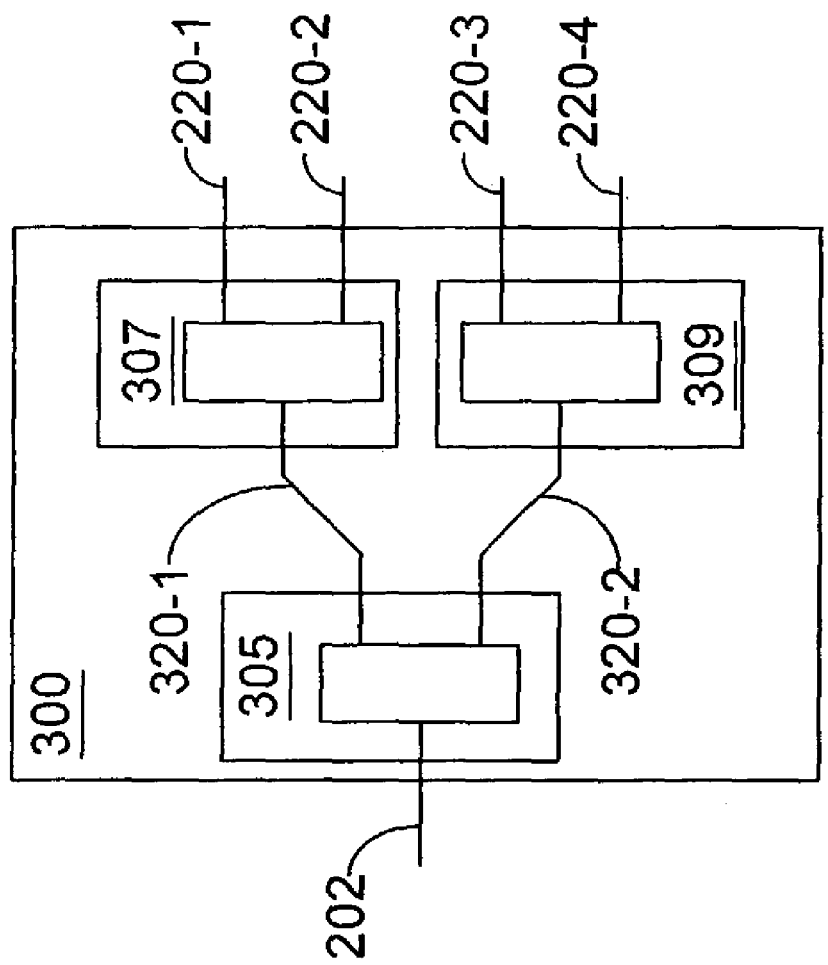
FIG. 3 is a detailed schematic view illustrating one of the 1×N switch elements of FIG. 2.

FIG. 3 is a detailed schematic view illustrating one of the 1×N switch elements 300 of FIG. 2. The 1×N switch element 300 is a 1×4 configuration that comprises three 1×2 switch elements 305, 307 and 309. For example, an optical signal input via connection 202 to 1×2 switch element 305 is directed either via waveguide portion 320-1 to an input of 1×2 switch element 307, or directed via waveguide portion 320-2 to an input of 1×2 switch element 309. The input signal to 1×2 switch element 307 is then directed either to output line 220-1 or 220-2. Similarly, the signal input on waveguide portion 320-2 is directed by 1×2 switch element 309 either to output line 220-3 or 220-4. In this manner, various configurations of 1×2 switch elements can be configured to form a 1×N switch element.

The maximum number of switching elements through which a signal passes when traversing the optical switch engine 200 is lower than in a comparable matrix switch. For example, for the N×N optical switch engine 200 where N is a power of 2, an optical signal passes through $2j1\times2$ switches, where $2^j=N$. In contrast, the longest path through a matrix switch requires that the signal pass through 2N−1 switches.

For N=4, j=2 and thus for the optical switch engine 200, the maximum number of switch elements through which a signal must pass is 4, while for a matrix switch, the maximum number of switch elements through which a signal must pass is 7. This difference is significant when applied to optical switches having a large number (on the order of 128) inputs and outputs, and can result in a significant difference in signal-to-noise ratio between signals traversing a matrix switch architecture. Furthermore, for the 2N (1×N) architecture of the optical switch engine 200, the difference in signal-to-noise ratio between optical signals is significantly reduced.

Figure 4:
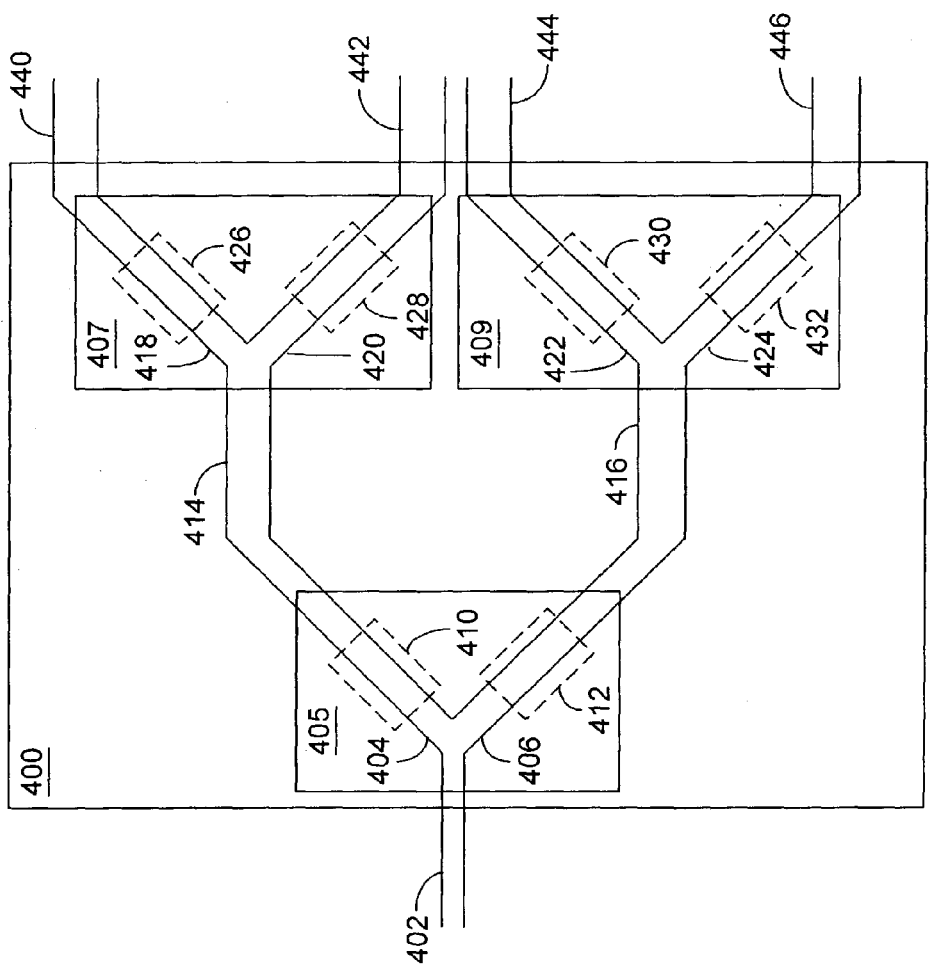
FIG. 4 is a schematic representation of the semiconductor based 1×N switch element of FIG. 3.

FIG. 4 is a schematic representation of the semiconductor based 1×N switch element 300 of FIG. 3. However, the semiconductor based switch element in FIG. 4 will be referred to using reference numeral 400. A light signal input on waveguide portion 402 is directed to 1×2 switch element 405. The 1×2 switch element 405 includes waveguide portions 404 and 406, each including a semiconductor-based amplifier 410 and 412, respectively.

The optical signal on connection 402 is divided whereby preferably one-half of the light intensity enters waveguide portion 404 and the other half enters waveguide portion 406. Depending upon the manner in which the amplifiers 410 and 412 are biased, the light will either be transmitted or attenuated through the amplifiers 410 and 412. For example, in order to direct and amplify the optical signal through the amplifier 410 towards waveguide portion 414, the amplifier 410 should be forward biased while the amplifier 412 will be oppositely biased with respect to the amplifier 410.

When the amplifiers 410 and 412 are reverse biased they form very effective attenuators, thereby preventing the optical signal from passing through the amplifier into the subsequent waveguide portion. When the amplifier 410 is forward biased, the optical signal is transferred into waveguide portion 414 where the light intensity is again divided into waveguide portions 418 and 420. The 1×2 switch element 407 operates in similar manner to that described above with respect to the 1×2 switch element 405. In this manner, the light signal entering waveguide portion 402 can be directed by the 1×4 semiconductor based switch element 400 into any of the waveguide portions 440, 442, 444 or 446.

Further, assuming that a signal is to be directed from, for example, waveguide portion 402 to waveguide portion 440, the 2N(1×N) architecture allows for the desired signal to be selected twice (first in amplifier 405 and then again in amplifier 407), thereby providing double the cross-talk rejection. Because the signal-to-noise ratio of a signal degrades each time a crosspoint (amplifiers 405, 407 and 409 in FIG. 4) is traversed, lowering the overall number of crosspoints decreases the signal-to-noise ration degradation of the optical signals traversing the switch 400.

FIGS. 5A and 5B are cross-sectional schematic views collectively illustrating different views of an exemplary embodiment in accordance with the invention of the amplifier portions of FIG. 4. Preferably, the semiconductor layers that form both the waveguides and the amplifiers (FIG. 4) are grown and doped so that optical gain is created in the amplifiers while low loss is a characteristic of the waveguides. Preferably, a low-loss, double confinement, heterostructure waveguide structure having superior lateral confinement properties is fabricated. One possible waveguide structure is a semi-insulating planar buried heterostructure (SIPBH). Another possible waveguide structure is a ridge waveguide structure. Such waveguide structures are known to those having ordinary skill in the art.

Referring now to FIG. 5A, semiconductor amplifier 500, in which light traversing the amplifier 410 would appear to travel across the page, includes an indium phosphide (InP) buffer layer 506 grown over an InP substrate 504. A gallium indium arsenide phosphide (GaInAsP) lower cladding layer 508 is grown over the InP buffer layer 506. A GaInAsP active layer 510 having a bandgap lower than the bandgap of the lower cladding layer 508 is grown over the GaInAsP lower cladding layer 508 and a GaInAsP upper cladding layer 512 having a bandgap higher than the bandgap of the active layer 510 is grown over the active layer 510.

In this example, the active layer 510 is structured so that light having a wavelength of approximately 1.3 to 1.55 micrometers ($\mu$m), or microns, can be amplified by the amplifiers and directed by the low loss waveguides to be described below. A GaInAs contact layer 514 is grown over the GaInAsP upper cladding layer 512. The upper cladding layer 512 and lower cladding layer 508 are oppositely doped either n type or p type depending upon the bias desired for the particular application so that a pn junction is formed between the upper cladding layer 512 and the lower cladding layer 508. An electrical contact 502 is applied to the surface of the InP substrate 504 opposite that of the InP buffer layer 506.

FIG. 5B is a longitudinal cross-sectional schematic view 530 illustrating the semiconductor amplifier of FIG. 5A. In FIG. 5B, light traveling through the amplifier 410 would travel into or out of the page. The buffer layer 506 is grown over the substrate layer 504. The lower cladding layer 508, active layer 510, upper cladding layer 512 and contact layer 514 are bounded by iron doped regions 520 of indium phosphide (InP:Fe). The InP:Fe regions 520 help to confine the electrons, holes and the light to the approximately three $\mu$m wide portion of the active region 510. The electrical contact 502 is applied to the opposite surface of the substrate layer 504.

Figure 5C:
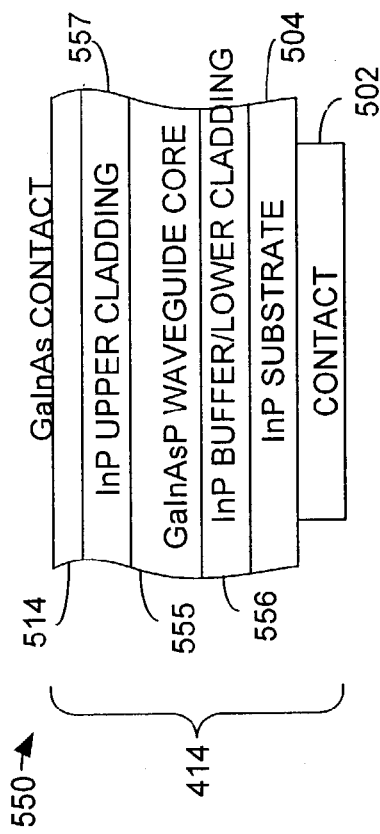
FIGS. 5C and 5D are cross-sectional schematic views collectively illustrating different views of an exemplary embodiment in accordance with the invention of the waveguide portions of FIG. 4.
Figure 5D:
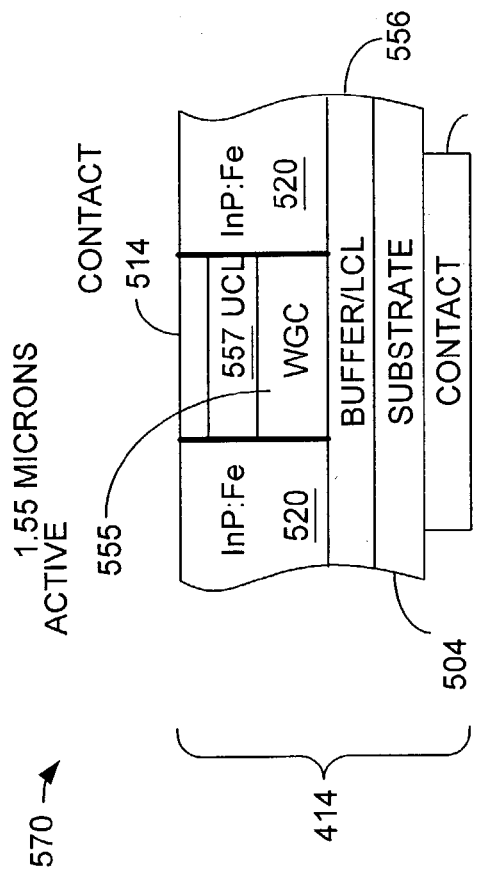

FIGS. 5C and 5D are cross-sectional schematic views collectively illustrating different views of one exemplary embodiment in accordance with the invention of the waveguide portions of FIG. 4. FIG. 5C illustrates waveguide portion 550 in which an indium phosphide (InP) buffer/lower cladding layer 556 replaces the InP buffer layer 506 of FIG. 5A. Further, a GaInAsP waveguide core 555 replaces the active region 510 of FIG. 5A. In FIG. 5C the waveguide portion 550 includes an upper cladding layer 557 that is constructed using InP. The structure shown in FIG. 5C guides the optical signals between the amplifiers of FIG. 4.

FIG. 5D is a longitudinal cross-section schematic view 570 illustrating the semiconductor waveguide of FIG. 5C. The buffer/lower cladding layer 556 is grown over the substrate 504. The buffer/lower cladding layer 556, waveguide core 555, upper cladding layer 557 and the contact layer 514 are bounded by the iron doped regions 520 of indium phosphide (InP:Fe) and functions as described above with respect to FIG. 5B.

Figure 6:
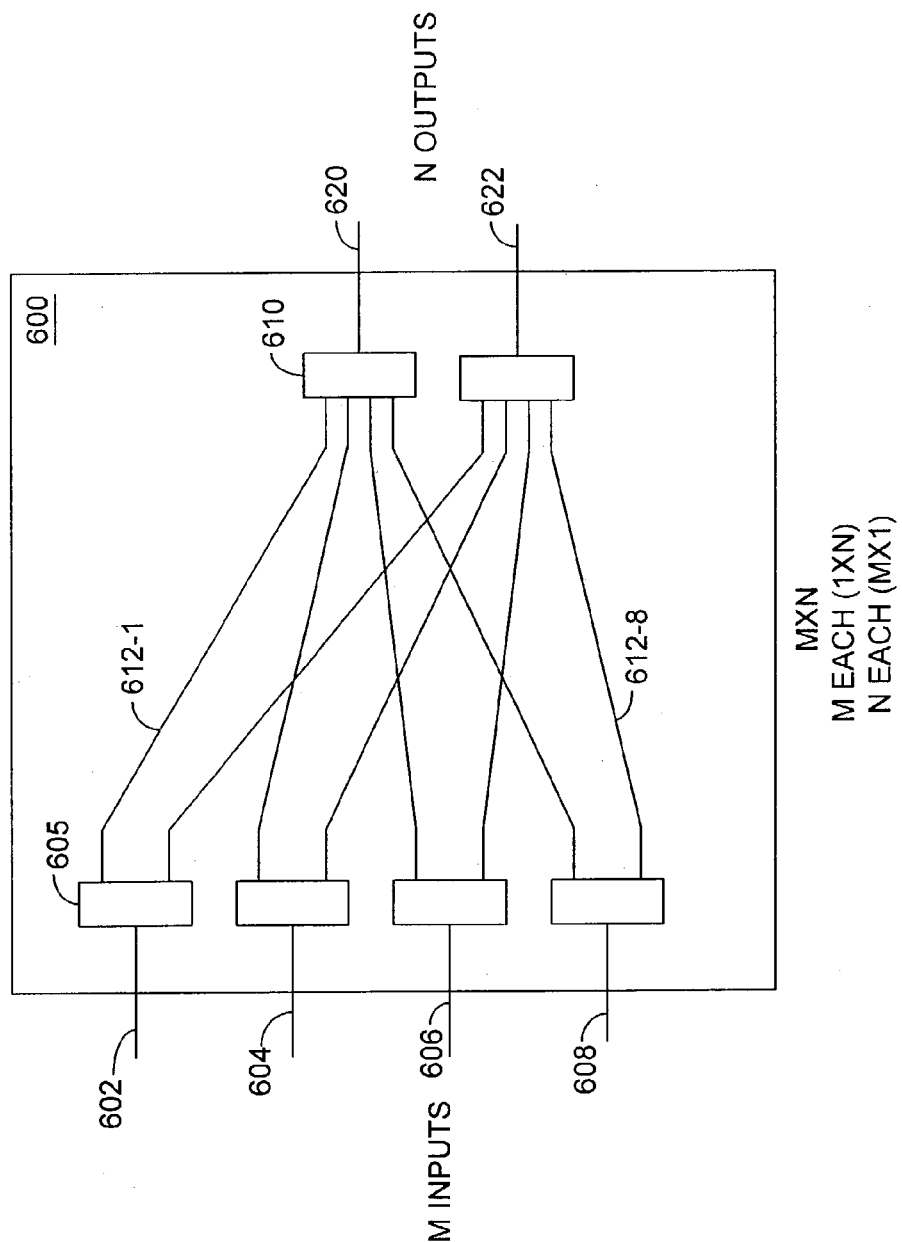
FIG. 6 is a detailed schematic view illustrating an alternative embodiment in accordance with the invention of the switching architecture shown in FIG. 2.

FIG. 6 is a detailed schematic view illustrating an alternative embodiment in accordance with the invention of the switching architecture shown in FIG. 2. The M×N switch engine 600 includes M each 1×N switching elements and N each M×1 switching elements, where M equals the number of inputs to the switch engine 600 and N is the number of outputs of the switch engine 600. In this embodiment in accordance with the invention, there are a total of four 1×2 input switch elements, an exemplary one of which is illustrated using reference numeral 605, and two 4×1 output switch elements, an exemplary one of which is illustrated using reference numeral 610. In the configuration shown in FIG. 6, each output of each of the input 1×2 switch elements 605 is connected to a respective input of each of the output switch elements 610. In this manner, the advantageous switch architecture described above can be used in a configuration in which the number of inputs differ from the number of outputs.

It will be apparent to those skilled in the art that many modifications and variations may be made to the preferred embodiments in accordance with the present invention, as set forth above, without departing substantially from the principles of the present invention. All such modifications and variations are intended to be included herein within the scope of the present invention, as defined in the claims that follow.

What is claimed is:

1. A semiconductor based opto-electronic switching apparatus, comprising:
   at least two 1×N switch elements fabricated on a semiconductor, each 1×N switch element including an input and at least two outputs;
   at least two M×1 switch elements fabricated on a semiconductor, each M×1 switch element including at least two inputs and at least one output;
   wherein the at least two 1×N switch elements are arranged such that a first output of a first 1×N switch element is coupled directly through a first dedicated optical waveguide to a first input of a first M×1 switch element and a second output of the first 1×N switch element is coupled directly through a second dedicated optical waveguide to a first input of a second M×1 switch element; and
   wherein a first output of a second 1×N switch element is coupled directly through a third dedicated optical waveguide to a second input of the first M×1 switch element and a second output of the second 1×N switch element is coupled directly through a fourth dedicated optical waveguide to a second input of the second M×1 switch element, and where the optical waveguides are of substantially equal length, thus equalizing delay through the switch.

2. The apparatus of claim 1, wherein the at least two 1×N switch elements and the at least two M×1 switch elements are fabricated from type III–V semiconductor materials.

3. The apparatus of claim 2, wherein M=N and a plurality of 1×N switch elements are arranged in a 2N (1×N) architecture.

4. The apparatus of claim 3, further comprising a plurality of semiconductor amplifiers associated with each of the 1×N and M×1 switch elements.

5. The apparatus of claim 1, wherein each optical waveguide is fabricated on a semiconductor.

6. The apparatus of claim 1, wherein each optical waveguide is an optical fiber.

7. A method for switching light in an opto-electronic switch, the method comprising:
   supplying light to a first 1×N switch element, the first 1×N switch element including an input and at least two outputs;
   directing the light from the input of the first 1×N switch element to one of the at least two outputs of the first 1×N switch element;
   coupling directly through a first dedicated optical waveguide the light from a first output of the first 1×N switch element to a first input of a M×1 switch element and coupling directly through a second dedicated optical waveguide the light from a second output of the first 1×N switch element to a first input of the second M×1 switch element; and
   coupling directly through a third dedicated optical waveguide the light from a first output of a second 1×N switch element to a second input of the first M×1 switch element and coupling directly through a fourth dedicated optical waveguide the light from a second output of the second 1×N switch element to a second input of the second M×1 switch element, where the optical waveguides are of substantially equal length, thus equalizing delay through the switch; and
   directing the light to an output of one of the at least two M×1 switch elements.

8. The method of claim 7, further comprising the step of fabricating the plurality of 1×N switch elements and the M×1 switch element from type III–V semiconductor materials.

9. The method of claim 8, wherein M=N and further comprising the step of arranging at least four 1×N switch elements in a 2N (1×N) architecture.

10. The method of claim 9, wherein the light is directed using a plurality of semiconductor amplifiers associated with each 1×N switch element.

11. The method of claim 7, wherein each optical waveguide is fabricated on a semiconductor.

12. The method of claim 7, wherein each optical waveguide is an optical fiber.

13. A semiconductor based opto-electronic switching apparatus, comprising:
   at least two 1×N switch elements fabricated on a semiconductor, each 1×N switch element including an input and at least two outputs;
   wherein the at least two 1×N switch elements are arranged such that first and second outputs of a first 1×N switch element are individually coupled directly through respective first and second dedicated optical waveguides to respective first inputs of first and second M×1 switch elements, the first and second M×1 switch elements fabricated on a semiconductor; and
   wherein first and second outputs of an Mth 1×N switch element are individually coupled directly through respective third and fourth dedicated optical waveguides to respective Mth inputs of the N−1 th and Nth 1×N switch elements, where the low loss optical waveguides are of substantially equal length, thus equalizing delay through the switch.

* * * * *